(12) United States Patent  (10) Patent No.: US 8,208,870 B2
Chuang et al.  (45) Date of Patent: Jun. 26, 2012

(54) HAND-HELD WIRELESS COMMUNICATION DEVICE WITH CERAMIC SCREWS

(75) Inventors: I-Cheng Chuang, Shindian (TW); Chi-Chieh Chan, Shindian (TW)

(73) Assignee: HTC Corporation, Taoyuan County (TW)

( * ) Notice: Subject to any disclaimer, the term of this patent is extended or adjusted under 35 U.S.C. 154(b) by 1226 days.

(21) Appl. No.: 11/345,496

(22) Filed: Feb. 2, 2006

(65) Prior Publication Data

US 2006/0234788 A1 Oct. 19, 2006

(30) Foreign Application Priority Data

Apr. 14, 2005 (TW) .............................. 94111891 A

(51) Int. Cl.
*H04M 1/00* (2006.01)
(52) U.S. Cl. ............... 455/90.3; 455/575.5; 455/575.1; 455/296; 343/702; 343/700; 343/895; 333/235; 333/193
(58) Field of Classification Search .............. 455/90.3, 455/575.1, 575.3, 575.5, 575.8, 575.2, 550.1; 343/895, 702, 700; 361/814
See application file for complete search history.

(56) References Cited

U.S. PATENT DOCUMENTS

| | | | | | |
|---|---|---|---|---|---|
| 4,536,117 | A | * | 8/1985 | Yamashiro | 411/411 |
| 5,405,227 | A | * | 4/1995 | His et al. | 411/366.3 |
| 5,728,445 | A | * | 3/1998 | Murakami et al. | 428/113 |
| 5,905,475 | A | * | 5/1999 | Annamaa | 343/895 |
| 5,982,881 | A | * | 11/1999 | Mischenko | 379/433.11 |
| 6,031,494 | A | * | 2/2000 | Okabe et al. | 343/702 |
| 6,420,476 | B1 | * | 7/2002 | Yamada et al. | 524/575 |
| 6,501,945 | B1 | * | 12/2002 | Chien | 455/296 |
| 6,538,536 | B1 | * | 3/2003 | Seely et al. | 333/235 |
| 6,876,724 | B2 | * | 4/2005 | Zhou et al. | 378/122 |
| 7,312,754 | B2 | * | 12/2007 | Noro et al. | 343/700 MS |
| 2002/0149539 | A1 | * | 10/2002 | Noro et al. | 343/895 |
| 2003/0023417 | A1 | * | 1/2003 | Chen et al. | 703/3 |
| 2003/0174029 | A1 | * | 9/2003 | Baier et al. | 333/193 |
| 2004/0066334 | A1 | * | 4/2004 | Fang et al. | 343/700 MS |
| 2004/0102229 | A1 | * | 5/2004 | Hutchison | 455/575.1 |
| 2004/0102230 | A1 | * | 5/2004 | Nuovo | 455/575.1 |
| 2005/0026660 | A1 | * | 2/2005 | Park et al. | 455/575.5 |
| 2005/0107137 | A1 | * | 5/2005 | Byun et al. | 455/575.1 |
| 2006/0061552 | A1 | * | 3/2006 | Santos et al. | 345/168 |
| 2007/0102733 | A1 | * | 5/2007 | Zhou et al. | 257/248 |

FOREIGN PATENT DOCUMENTS

| | | | |
|---|---|---|---|
| CN | 1493179 | A | 4/2004 |
| CN | 2694511 | Y | 4/2005 |
| JP | 2001331768 | * | 11/2001 |
| JP | 2002-185590 | | 6/2002 |

OTHER PUBLICATIONS

Uchimura, Hiroshi et al., "Development of a Laminated Waveguide", 1998, IEEE Transactions on Microwave Theory and Techniques, vol. 46, No. 12, Dec. 1998, pp. 2438-2443.*

(Continued)

*Primary Examiner* — Edward Urban
*Assistant Examiner* — Ganiyu Hanidu
(74) *Attorney, Agent, or Firm* — Rabin & Berdo, P.C.

(57) ABSTRACT

A wireless communication device having an antenna area includes at least a first component, a second component and a connector. The connector is made of ceramic material and is disposed in the antenna area for fixing and connecting the first component and the second component so as to avoid interference with the antenna. Adopting the ceramic connecters enables the wireless communication device to have the advantages of good locking performance, good antennal transmission efficiency and elegant appearance simultaneously and to provide an electrostatic shielding function.

20 Claims, 3 Drawing Sheets

OTHER PUBLICATIONS

Shino, Naoyuki et al., "77 GHz band Antenna Array Substrate for Short Range Car Radar", 2005, IEEE Microwave Symposium Digest, 2005 IEEE MTT-S International, pp. 2095-2098.*

"High Temperature Resistant Ceramics Material and Adhesive," Commerce Manufacturer Machinery Taipei China Asian Pacific R.O.C., http://web.archive.org/web/20041015175352/http://www.jasdi.com.tw/c/j.htm.

* cited by examiner

HAND-HELD WIRELESS COMMUNICATION DEVICE WITH CERAMIC SCREWS

This application claims the benefit of Taiwan application Serial No. 94111891, filed on Apr. 14, 2005, the subject matter of which is incorporated herein by reference.

BACKGROUND OF THE INVENTION

1. Field of the Invention

The invention relates in general to a wireless electronic device, and more particularly to a hand-held wireless communication device.

2. Description of the Related Art

Conventionally, the parts of an electronic device are normally fixed and connected by a connector made of metal material, and the disposition and locking position of the connector are determined based on the shape, size, structure, and position of the parts of the device. To prevent the metal connector exposed within the antenna radiation area from generating interference and static electricity, the disposition and locking position of the connector in the proximity of the antenna area need to be rearranged. Referring to FIG. 1, a diagram of a conventional hand-held wireless communication device is shown. To avoid the metal connector 10 being disposed in the antenna area 15 and in consideration of the structural requirements, an extra locking mechanism 17 is usually added to the original structural design. Consequently, the following problems arise:

(1) The protrudent locking mechanism 17 destroys the integrality of shape of the device.
(2) The addition of the locking mechanism 17 increases complexity in manufacturing.
(3) The distribution of the connectors is not uniform so that the clearances of two connected components in each locking position are inconsistent; thus, steps between the two connected components occur.

Besides, the metal connector adopted in a conventional device has good electric conductivity, so that the static electricity may be conducted to the printed circuit board via the metal connector and thus causes damage to the device.

SUMMARY OF THE INVENTION

It is therefore an object of the invention to provide a wireless communication device adopting a connector made of ceramic material, which has the advantages of good locking performance, good antennal transmission efficiency and elegant appearance simultaneously and provide an electrostatic shielding function.

The invention achieves the above object by providing a wireless communication device having an antenna area. The device includes at least a first component, a second component and at least a connector, wherein the connector disposed in the antenna area is made of ceramic material so as to avoid interference with the antenna and to fix and connect the first component and the second component.

The invention achieves the above object by further providing another wireless communication device having an antenna area. The device includes at least a housing and a plurality of connectors. The housing includes an upper cover and a lower cover. The connectors used for fixing and connecting the upper cover and the lower cover are uniformly distributed in the upper and lower cover so that an equidistant gap exists between the upper cover and the lower cover. The connector disposed in the antenna area is made of ceramic material to avoid interference with the antennal area.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention provides a hand-held wireless communication device having an antenna area. The connector disposed within the antenna area is made of ceramic material. The use of such connector can avoid interference with the antenna area and influence on the structural design and protect the device from being damaged by static electricity. The connector disclosed below is used for locking a housing of the hand-held wireless communication device, but is not limited to the manners disclosed in the embodiment. The ceramic connector of invention is also applicable to fixing and connecting any two components positioned within the antenna area.

Figure 2:
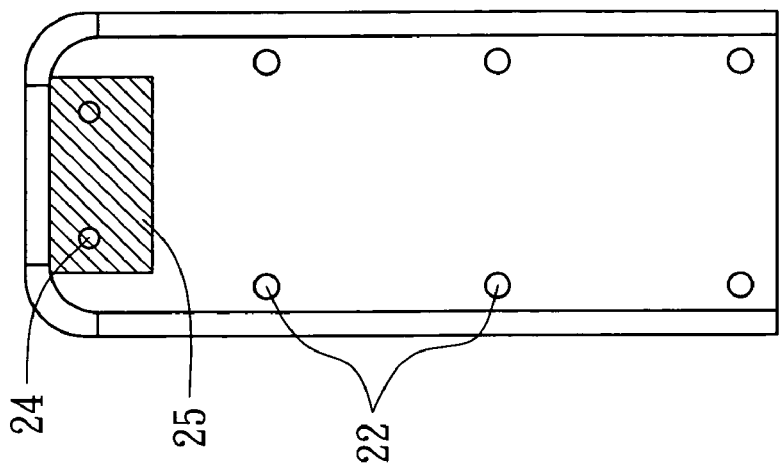
FIG. 2 is a diagram of a hand-held wireless communication device with ceramic screws according to a preferred embodiment of the invention.
Figure 1:
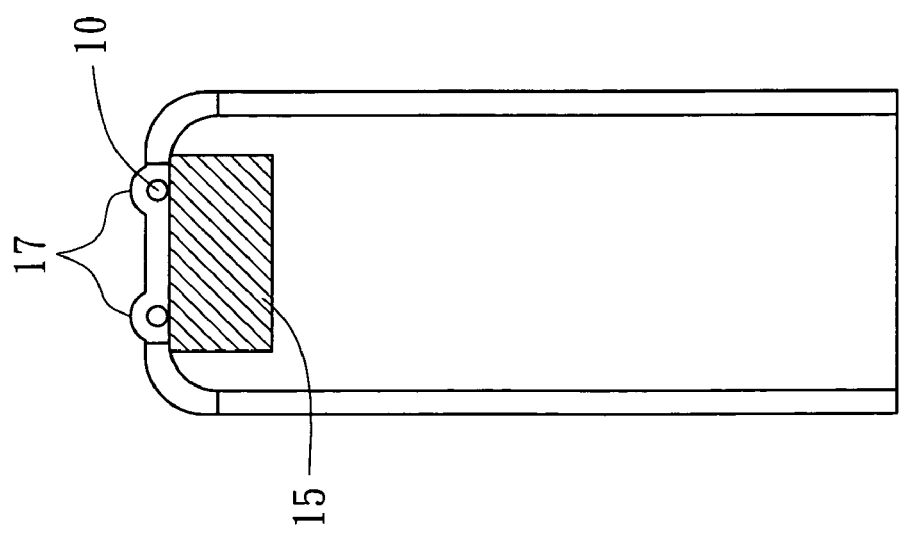
FIG. 1 is a diagram of a conventional hand-held wireless communication device.

Referring to FIG. 2, a diagram of a hand-held wireless communication device with ceramic screws according to a preferred embodiment of the invention is shown. The hand-held wireless communication device 20 comprises conventional screws 22, ceramic screws 24 and an antenna area 25. The hand-held wireless communication device 20 can be a hand-held device having an antenna area, such as mobile phone, personal digital assistant (PDA) mobile phone, smart phone, or walkie talkie. The ceramic screw 24 has the characteristics of high strength, anti-friction and high electricity insulation. Furthermore, the ceramic screw 24 does not contain any metal so that the antenna transmission efficiency is not affected, and that the ceramic screw 24 can be directly disposed within the antenna area 25 without adjusting the structure or the appearance of the device. Therefore, the locking positions of the conventional screws 22 and the ceramic screws 24 can be appropriately distributed on the hand-held wireless communication device 20 so as to avoid the uneven clearance and the nonequidistant gap occurred between components.

Figure 3B:
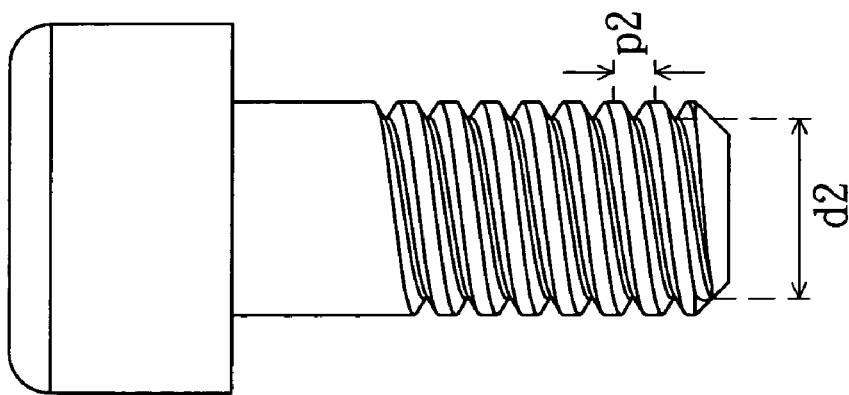
FIG. 3B is a diagram showing that the ceramic screw in FIG. 2 is ceramic mechanic screw.
Figure 3A:
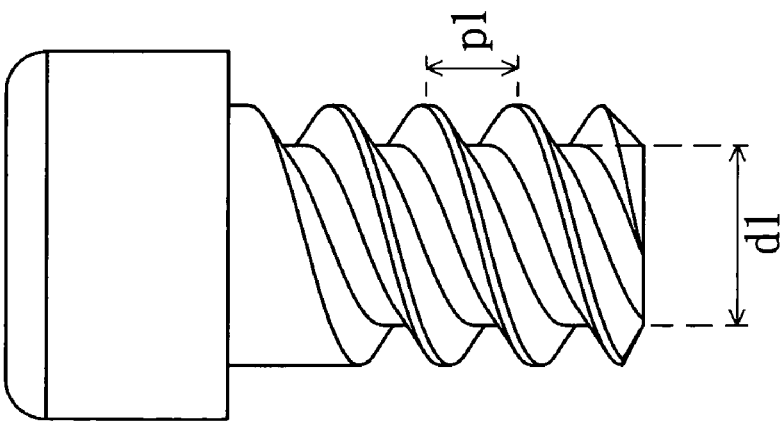
FIG. 3A is a diagram showing that the ceramic screw in FIG. 2 is a ceramic self-tapping screw.

Referring to FIG. 3A, a diagram depicting that the ceramic screw in FIG. 2 is a ceramic self-tapping screw is shown. The ceramic self-tapping screw is made of ceramic material and is a self-tapping type of connector. In FIG. 3A, the ceramic self-tapping screw has a pitch p1 substantially equal to 1 mm and an inner diameter d1 substantially equal to 2 mm. Referring to FIG. 3B, a diagram depicting that the ceramic screw in FIG. 2 is a ceramic mechanic screw is shown. The ceramic mechanic screw is made of ceramic material and is a non-self-tapping type of connector. In FIG. 3B, the ceramic mechanic screw has a pitch p2 substantially equal to 0.5 mm and an inner diameter d2 substantially equal to 2 mm.

Figure 4:
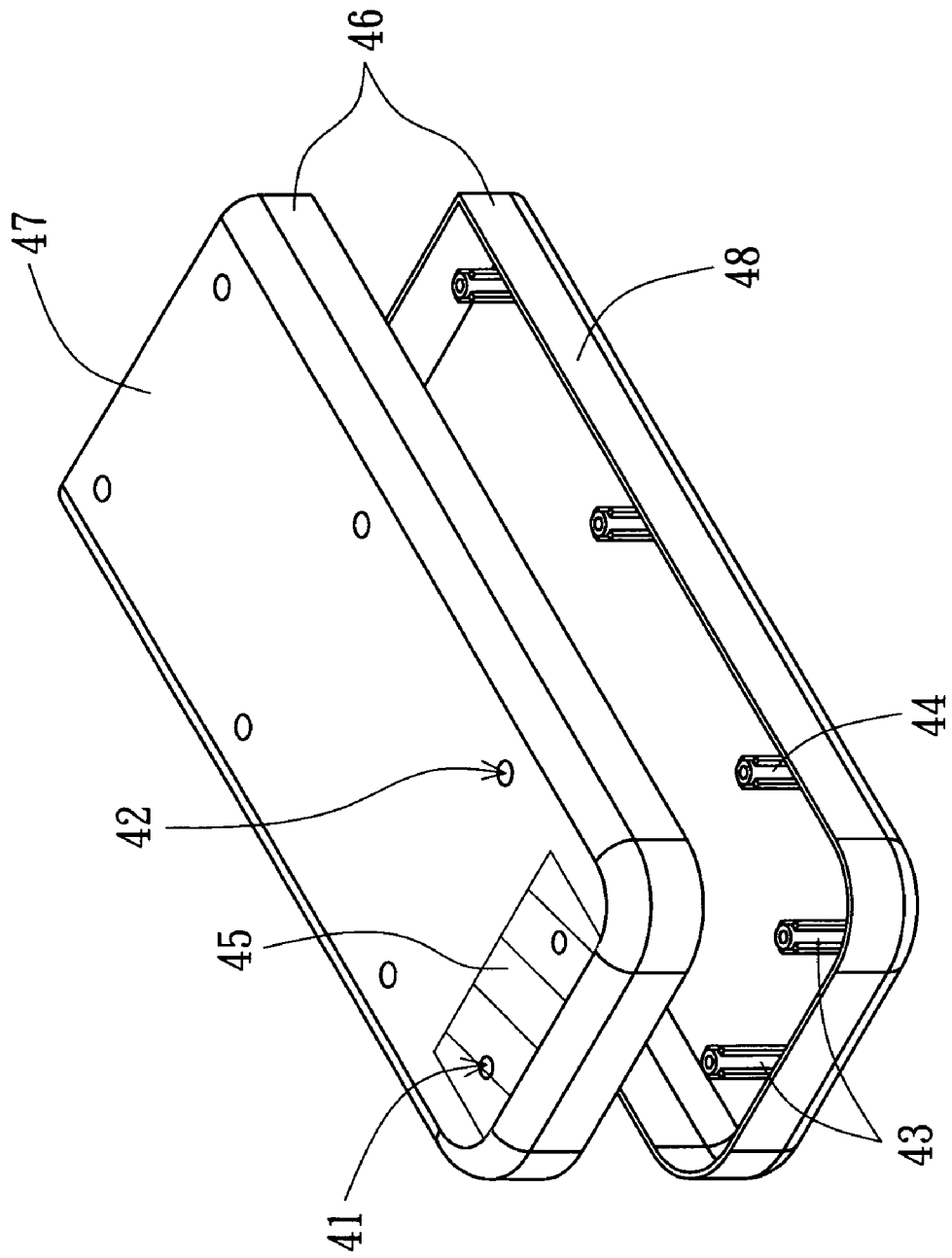
FIG. 4 is an exploded diagram of a housing of the hand-held wireless communication device shown in FIG. 2.

Referring to FIG. 4, an exploded diagram of a housing of the hand-held wireless communication device in FIG. 2 is shown. The housing 46 comprises an upper cover 47 and a lower cover 48. The upper cover 47 has at least a positioning hole 41 and a positioning hole 42. The lower cover 48 has at least a positioning hole 43 and a positioning hole 44. The ceramic screw, such as the ceramic self-tapping screw shown in FIG. 3A or the ceramic mechanic screw shown in FIG. 3B, penetrates the positioning holes 41 and 43 positioned within the antenna area 45 so as to lock and connect the upper cover 47 and the lower cover 48 of the housing 46. The screw locked outside the antenna area 45 can be any material in addition to the ceramic material, as long as the screw can penetrate the corresponding positioning holes 42 and 44 positioned in the upper cover 47 and the lower cover 48, respectively, to perform the function of fixing and connecting components.

According to the wireless communication device disclosed in above embodiment of the invention, the ceramic screw does not contain any metal and does not interfere with antenna. Therefore, the locking positions of the screws can be appropriately distributed in the upper and lower covers without taking the antenna area into consideration. An equidistant gap is formed between the upper cover and the lower cover, and the steps between the components are reduced. The design of appearance is not subject to the distribution of locking positions of the screws. Therefore, the excellences of locking performance, antennal efficiency and elegant appearance can be achieved simultaneously. The ceramic screw provides an electrostatic shielding function to protect the device. The use of self-tapping screw dispenses with a buried nail for match, thus saving manufacturing time and enhancing yield rate of products.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless communication device, having an antenna radiation area, the device comprising:
   a first component having a first positioning hole;
   a second component having a second positioning hole, the antenna radiation area being positioned within borders of one of the first and second components, and an antenna patched within the antenna radiation area; and
   a connector disposed within borders of the antenna radiation area and penetrating the antenna radiation area, the connector penetrating the first positioning hole and the second positioning hole and penetrating a surface for patching the antenna within the antenna radiation area, for fixing and mechanically connecting the first component and the second component, wherein the connector is made of ceramic material to avoid interference with the antenna radiation area.

2. The device according to claim 1, wherein the connector is a self-tapping connector.

3. The device according to claim 2, wherein the connector is a ceramic self-tapping screw.

4. The device according to claim 3, wherein the ceramic self-tapping screw has a pitch substantially equal to 1 mm and an inner diameter substantially equal to 2 mm.

5. The device according to claim 1, wherein the connector is a non-self-tapping connector.

6. The device according to claim 5, wherein the connector is a mechanical ceramic screw.

7. The device according to claim 6, wherein the mechanical ceramic screw has a pitch substantially equal to 0.5 mm and an inner diameter substantially equal to 2 mm.

8. The device according to claim 1, wherein the first component is an upper cover and the second component is a lower cover.

9. The device according to claim 1, wherein the device is a hand-held wireless communication device.

10. A wireless communication device, having an antenna radiation area, the device comprising:
    a housing, comprising an upper cover having a plurality of first positioning holes and a lower cover having a plurality of second positioning holes, the antenna radiation area positioned within borders of one of the upper cover and the lower cover, and an antenna patched within the antenna radiation area; and
    a plurality of connectors penetrating the antenna radiation area for fixing and mechanically connecting the upper cover and the lower cover, the connectors penetrating the plurality of first positioning holes and the plurality of second positioning holes and penetrating a surface for patching the antenna within the antenna radiation area, the connectors being uniformly distributed in the upper and lower covers so that an equidistant gap exists between the upper cover and the lower cover, wherein at least one of the connectors disposed within borders of the antenna radiation area is made of ceramic material so as to avoid interference with the antenna radiation area.

11. The device according to claim 10, wherein the ceramic connector is a self-tapping connector.

12. The device according to claim 11, wherein the ceramic connector is a ceramic self-tapping screw.

13. The device according to claim 12, wherein the ceramic self-tapping screw has a pitch substantially equal to 1 mm and an inner diameter substantially equal to 2 mm.

14. The device according to claim 10, wherein the ceramic connector is a non-self-tapping connector.

15. The device according to claim 14, wherein the ceramic connector is a mechanical ceramic screw.

16. The device according to claim 15, wherein the mechanical ceramic screw has a pitch substantially equal to 0.5 mm and an inner diameter substantially equal to 2 mm.

17. The device according to claim 10, wherein the device is a hand-held wireless communication device.

18. The device according to claim 10, wherein the device is a mobile phone.

19. The device according to claim 1, wherein a penetrating direction of the connector is substantially perpendicular to the surface for patching the antenna within the antenna area.

20. The device according to claim 10, wherein a penetrating direction of the at least one of the connectors is substantially perpendicular to the surface for patching the antenna within the antenna area.

* * * * *